INVENTORS
MARIO SCIAKY
EMMANUEL JULIEN THIRION

.

United States Patent Office 3,623,213
Patented Nov. 30, 1971

---

3,623,213
PROCESS AND MACHINE FOR FRICTION WELDING
Mario Sciaky, Saint-Cloud, and Emmanuel Julien Thirion, Paris, France, assignors to Welding Research, Inc., Chicago, Ill.
Filed Jan. 14, 1969, Ser. No. 791,023
Claims priority, application France, Mar. 8, 1968, 143,078
Int. Cl. B23k 27/00, 31/02
U.S. Cl. 29—470.3       8 Claims

ABSTRACT OF THE DISCLOSURE

This disclosure relates to the process of friction welding and, specifically, to a method and apparatus whereby the mechanical work transferred to the parts to be welded is controlled in accordance with a pre-established program of energy versus time. The energy being supplied to the work pieces is determined by measuring the angular rotation and the resistant torque between the two parts rubbing one against the other, or by measuring the temperature of the parts. The measured values are compared to the preset reference values and the axial force between the parts being welded is controlled so as to maintain the error between the reference and the energy input as close to zero as possible.

---

Friction welding machines are operating by the release of heat obtained by the contact of a fixed part against a rotating part.

The tangent components of the forces of friction thus created produce a resistant couple.

At all times, the power transformed into heat is equal to the product of this resistant couple by the angular speed of the moving part in relation to the fixed part.

When the quantity of heat thus produced has been sufficient to heat the parts to the welding temperature, one stops, by appropriate means, the movement of rotation and one exerts, in the direction of the axis, a force permitting the parts to weld.

The expression of work which has produced the heat is given by the integral $$\int_c^t Cr w \, dt$$

$Cr$ = resisting couple
$w$ = angular speed
$t$ = duration of the operation

In order that a welding machine be able to insure an industrial production, it is necessary that all the welds made on similar parts be identical. One can consider that this result is obtained if all the parameters remain identical when the parts to be welded are put through the machine.

The machines already known and usually used to make friction welds, which are of various concepts, do not meet these requirements, however.

In a first category of machines, the duration of the operation is fixed and the angular speed remains almost constant. In order to obtain, during the period of heating of the work pieces, the same quantity of heat, it is necessary that the resisting couple be the same each time. It is difficult to be certain that this is always the case.

It is possible to control at will the force exerted between the parts to be welded, but the tangential components of the friction forces which result are very variable and the resisting couple thus created varies during the whole operation. As a result the quantities of heat produced during identical times are different.

In a second category of machines, an attempt has been made to overcome this inconvenience by using a different principle. A predetermined quantity of energy is stored in a rotating flywheel and then released to the work by bringing the two parts to be welded, one fixed and the second rotating, in contact with one another. Since one of the parts to be welded is driven by the flywheel, the latter supplies its energy to the parts and its speed decreases. According to each case, the operation is terminated when the final speed has reached a predetermined value, or when the machine is stopped. In all the cases, the energy supplied by the flywheel to the parts to be welded is well known and it is always the same. However, a parameter which must not be neglected is the duration of the operation of heating the parts.

In the machines of the first category, this parameter is selected by the operator and its does not change, but it is no longer the case with machines utilizing energy stored in a flywheel, for the time after which the flywheel can reach the final predetermined speed, the latter being possibly zero, depends on the resisting couple produced by the parts to be welded. So, for a given temperature, the quantity of heat to supply to the parts is greater as the heating time becomes greater. For the losses of heat, through conduction, through radiation and convection are proportional to the duration of the operation. This is why the control of these machines, by means of a device supplying a constant energy, does not permit to compensate for the variations of the resisting couple.

In order to avoid these inconveniences, one has already tried to regulate, according to a predetermined programming, the force exerted by a jack on the parts to be heated, but this is not sufficient since there are no means of knowing the resisting couple produced.

The present invention has namely for object to offer a remedy to these inconveniences and pertains to, to this effect, a friction welding process consisting in driving into rotation at least one of the parts to be welded and to apply it against the other part to be welded, in order to produce a release of heat resulting from the friction of the two parts, then to immobilize the two parts by pressing them against each other in order to weld them, the process characterized in that a value is determined on a function of the heating of the parts resulting from the friction, and this value is compared to a reference value, in order to control the device determining the pressure of the two parts against each other. This permits one to obtain an identical heating of the parts, whatever the variations of the parameters influencing the heating.

According to another characteristic of the invention, one determines this value as a function of the temperature measured by an optical pyrometer arranged near the parts to be welded.

The invention also pertains to friction welding machines in conformity with or similar to the invention.

According to another characterstic of the invention, the sensing device measuring the value of the couple of the reaction of the motor driving one of the parts is connected to a stator of the driving motor, the said motor being supported by means of bearings receiving the shaft of the rotor of this motor.

The invention also covers the following characteristics and their various possible combinations.

A process in conformity with the invention is illustrated, as a non-limiting example, on the enclosed drawings, in which.

Consequently, the apparatus in conformity with the invention, has for object to introduce a value in function of the heat during the welding operation by friction, to compare its measurement to the value predetermined by a programming, to correct the difference by an automatic device and to thus obtain comparable welds with predetermined parameters.

Figure 1:
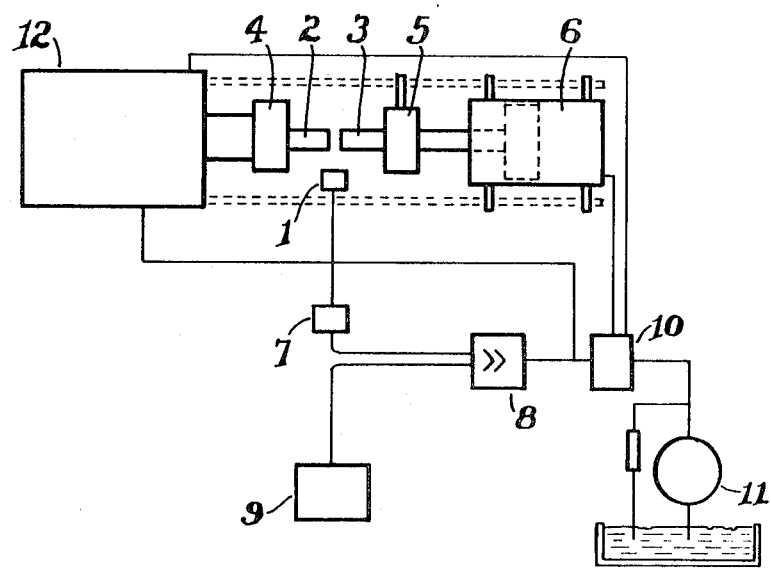
FIG. 1 represents a first mode of realization of a machine in conformity wtih the invention.

In the example of realization of FIG. 1, this result is obtained by means of an optical pyrometer including a sensing device placed near the parts to be welded 2 and 3.

This optical pyrometer, known in itself, is constituted by an optical device by means of which the image of a hot body is formed on a sensitive thermocouple.

One of these parts 2 is mounted on a mandrel 4 which is driven into rotation by any driving device 12.

The other part to be welded 3 is arranged on a mandrel 5, stationary in rotation, which is connected to the piston rod of a jack 6, the said jack determining the pressure of the two parts 2 and 3, one on the other.

In the example of realization represented on FIG. 1, the optical pyrometer 1 produces a voltage analog of the temperature reached for the parts 2 and 3, which is amplified by an amplifier 7, and is compared to a preset reference value derived from a voltage supply 9.

The pyrometer 1 is arranged near the parts to be welded and is oriented in such a manner that the image of the parts is formed on the sensitive part of the pyrometer.

The voltage developed at the terminals of this pyrometer is therefore a function of the temperature reached and is opposed to a preset voltage corresponding to the desired temperature.

When the voltage of amplifier 7 is higher than the preset voltage, the difference signal so produced is amplified by amplifier 8. Its output voltage acts upon, on one hand, the driving mechanism 12 in order to stop part 2 and, on the other hand, on the electro-valve 10 which controls the feeding of jack 6 from pump 11, in order to press against each other parts 2 and 3 and to effect the forging operation, and, eventually, in order to brake the rotation of part 2 in case it is not completely still.

Figure 2:
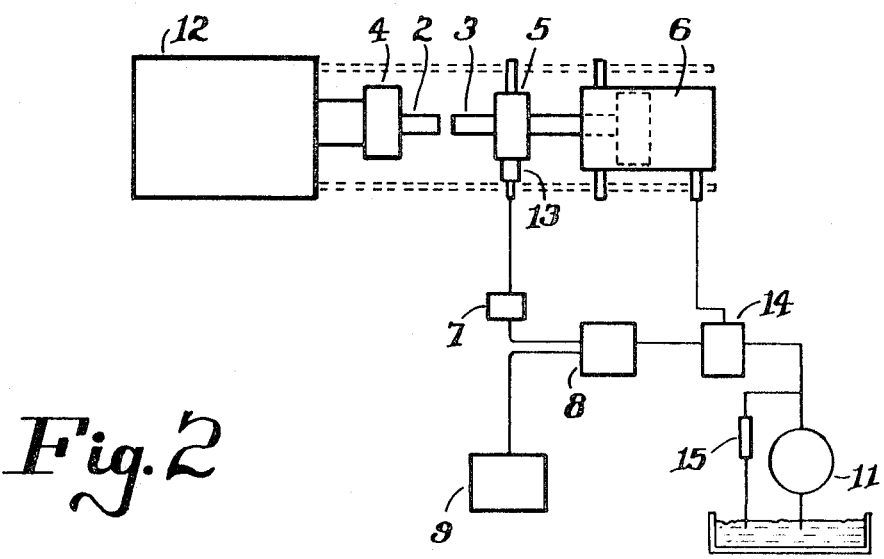
FIG. 2 is another mode of realization of the machine.

In the example of realization of FIG. 2, comparable welds can be obtained from one operation to the other, by providing for a sensing device 13 dependent upon the fixed mandrel 5, the said sensing device being realized in a well known manner, which produces a voltage proportional to the resisting couple.

The sensing device can be, for example, made to transform a mechanical measure into an electrical measure, and be constituted, for example, by resistant wire extensometers called, also, strain-gauges.

This voltage brought into amplifier 7 is compared at 8 to a reference voltage fixed or variable coming from 9 and corresponding to the desired friction couple between the parts 2 and 3. The spread between the two voltages constitutes an error voltage which, when coming out of the amplifier 8, is brought to the coil of an continuously adjustable valve 14, which regulates the pressure of the fluid by controlling the current of passing through the coil of its electro-magnet. This valve is placed between the pump 11 and the jack 6 which produces the force of friction.

In parallel, on this pump 11, is also provided a valve 15 destined to constitute a return circuit limiting the pressure.

Figure 3:
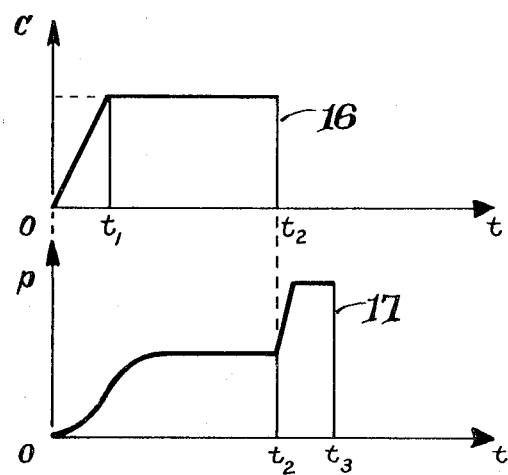
FIG. 3 represents an example of programming of the welding machine.

On FIG. 3 is represented a diagram constituting a programming control of the welding machine.

On curve 16 is represented the couple of friction C in function of the time, while curve 17 represents the pressure of the fluid P in the jack in function of the time.

At the initial time O, the part is in rotation, and one increases linearly the recorded voltage determining the value of the friction couple, so that the latter reach the value $C_1$ at time $t_1$.

The couple maintains this value $C_1$ until $t_2$. During this period, the pressure of the fluid has varied under the action of the control apparatus in the sole aim of producing the desired resisting couple. The rotation is stopped at time $t_2$ and the pressure of the fluid is adjusted to a value higher in order to supply the upsetting force necessary for welding the parts. The latter depends on the nature of the materials to be assembled and the cross section of the parts.

Instead of measuring the useful couple of torsion by a sensing device corresponding to 13, one can measure the reaction couple of the motor arrangement; but, one must add to that the couple produced by the moment of inertia of the kinematic chain and proportional to:

$$dw/dt$$

Figure 4:
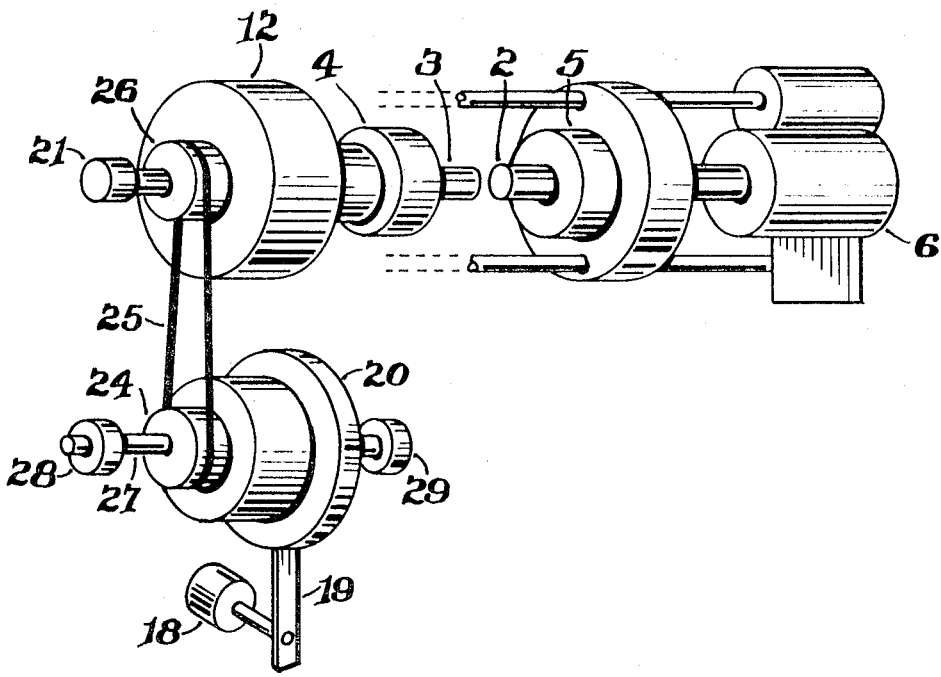
FIG. 4 represents another mode of realization of the device permitting to determine the heating of the parts to be welded.

FIG. 4 represents a mode of realization of such a machine.

In this case, a force sensing device, 18, for example, of the dynamometer type, producing a voltage proportional to the force applied, is hung onto a lever 19 fixed to the stator of the driving motor 20, in order to measure the couple of reaction of this motor.

On the other hand, the proportional voltage $dw/dt$ is obtained by taking the derivative of the voltage supplied by a dynamo tachometer 21.

Figure 5:
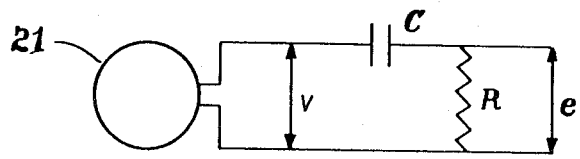
FIGS. 5 and 6 represent two modes of realization of a circuit determining a value in function of the couple produced by the moment of inertia of the kinematic chain.

According to FIG. 5, this derivative is obtained by a circuit RC out of which the voltage $e$ is given by the formula $$e = RC \frac{dv}{dt}$$

if $e$ is small with respect to $v$.

Figure 6:
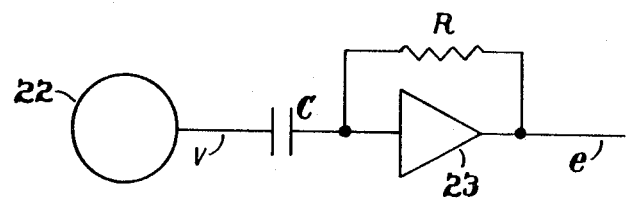

In the example of realization of FIG. 6, one uses an operational amplifier 23 arranged in a differentiating circuit comprising a DC with feedback whose gain is very high.

In the example of realization of FIG. 4, the stator of the motor connected to the sensing device includes a rotor provided with a pulley 26 on the shaft receiving part 3. Shaft 27 of this rotor is supported, at its extremities, by bearings 28 and 29. In this way, by adjusting the respective values of voltages translating the couple of reaction coming from the sensing devices 18, and the derivative of the speed coming from the tachometer 21, and by adding these values, one obtains a voltage proportional to the couple of friction.

It will, however, be possible to simplify the realization of the machine in conformity with the invention, by providing, in order to drive part 3, a motor whose current is proportional to its motor couple.

It will also be possible to obtain the same result with an hydraulic motor whose motor couple is proportional to the pressure of the fluid.

Figure 7:
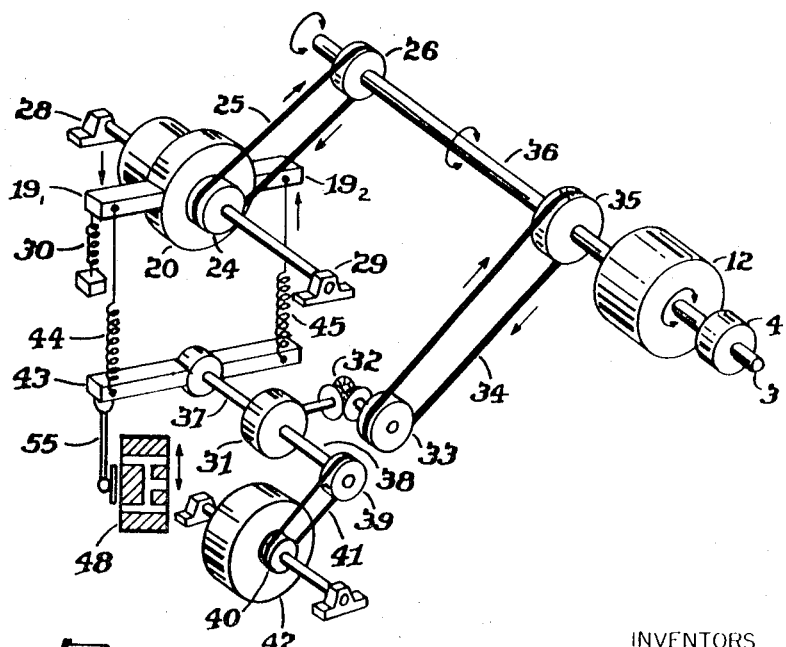
FIG. 7 represents a mechanical realization of a device for the determination of the couple produced by the moment of inertia of the kinematic chain.

The couple of reaction of the motor and the couple produced by the moment of inertia of the kinematic chain $jdw/dt$ can be obtained in the following manner (FIG. 7).

The couple of reaction of the motor is determined by the angle of rotation of the stator 20 of the motor whose rotor shaft is mounted on bearings 28 and 29.

The stator includes, in this case, two arms $19_1$, $19_2$ whose one 19, is connected to a spring 30 working under pressure. This spring is connected, by its free end, to a fixed point; in this way, the stator 20 of the motor turns in an angle proportional to the reaction couple of the motor.

The value function of the couple of inertia of the kinematic transmission is obtained by an assembly making a mechanical similarity.

In this case, a differential 31 is driven, through gears with angle returns 32, a pulley 33 and a belt 34, starting from pulley 35 mounted on the main shaft 36 of the machine which supports the mandrel 4 of part 3.

This differential 31 includes two exit shafts 37 and 38. Shaft 38 is connected, by pulleys 39 and 40 and a belt 41, to a flywheel 42. Shaft 37 supports a lever 43 which is connected by an elastic connection made, for example, of springs 44 and 45 to arms $19_1$ and $19_2$ of the stator 20 of the driving motor.

In this manner, when a variation in speed occurs, the flywheel 42 generates a couple proportional to $dw/dt$.

This couple is balanced by the elastic connection 44, 45 and the angle at which shaft 37 of the differential rotates, in relation to the stator of motor 20, is proportional to the value $dw/dt$. (It is the same for its direction.)

Lever 43 mounted on the shaft of the differential rotates, in relation to a fixed point, to an angle proportional to the sum of the two couples and, consequently, to the couple of friction exerted on the parts to be welded.

Figure 8:
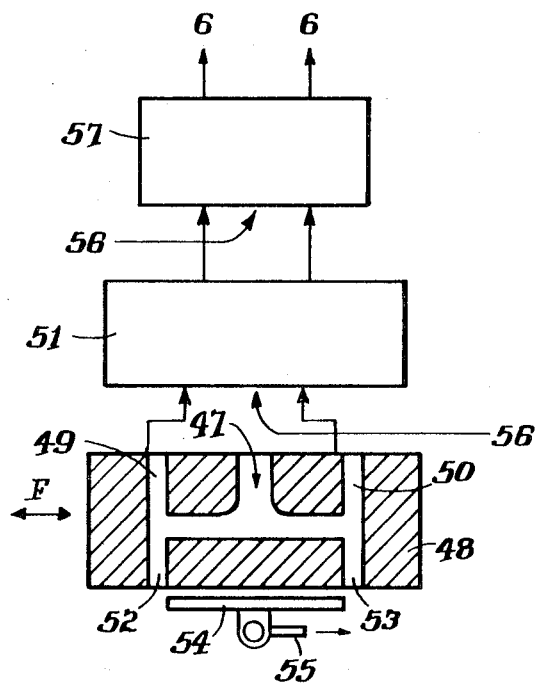
FIG. 8 is a schematic representation showing a means of transmission to the jack controlling the pressure between the parts, data relative to the couple of reaction of the motor arrangement and to the couple produced by the moment of inertia.

This data is then utilized by the apparatus represented on FIG. 8 or by any other similar device.

A fluid under pressure, for example air, penetrates in the center orifice 47 of a detecting block 48. The exits of the fluid 49, 50 are connected to a proportional fluid amplifier 51, known in itself, and operating on a principle which has also been used to build logic fluid circuits.

Also, this detecting block 48 includes two orifices 52 and 53 opening on a plane surface and, in front of this plane surface, is moved a shutter 54 connected by a rod 55 to a lever 43 mounted on shaft 37 of the differential. This detecting block 48 is mounted movable in the direction of arrows F so that it is possible to preset the value of the friction couple.

The width of shutter 54 is equal to the distance between the orifices 52 and 53, so that, when it is placed in the median position, the braking of the fluid which escapes from orifices 52 and 53 is the same, and the pressures, at 49 and 50, on the proportional fluid amplifier are identical.

On the other hand, when the shutter is displaced towards the left, it brakes the fluid which escapes through orifice 52, so that the pressure at 49 increases; in this case, orifice 53 is disengaged, the fluid is no longer braked and the pressure decreases at 50.

When the shutter is displaced towards the right, the opposite occurs and the pressure increases at 50. The proportional amplifier 51 operating with a fluid under pressure is a nonmovable apparatus known in itself; it is fed in fluid under pressure by a pipe as sketched in 56.

The exits of the proportional amplifier 51 are connected to a servo valve 57 functioning in the manner of a valve with progressive action in serving to feed the jack of the welding machine.

The connections between the servo valve 57 and jack 6 are such that the jack is fed when orifice 53 is closed by shutter 54, i.e., that the shutter is located at the right of the detecting block 48.

Figure 9:
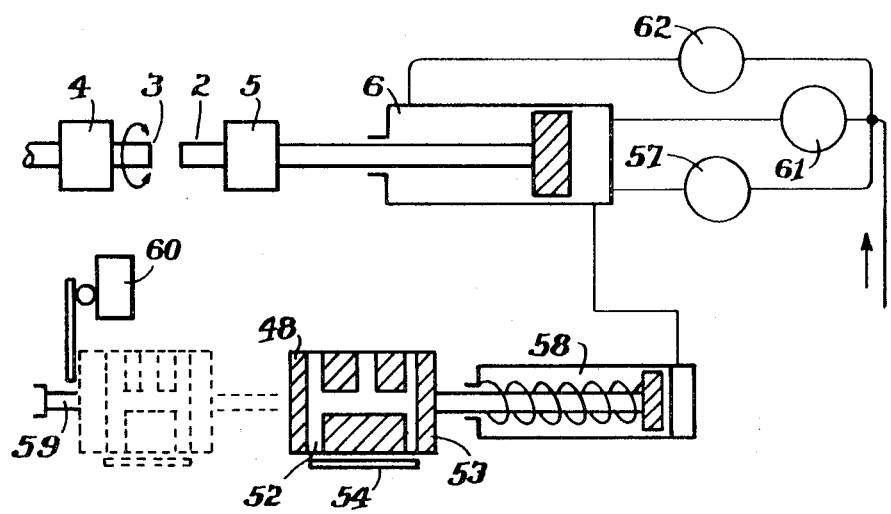
FIG. 9 represents, schematically, a mode of realization of the arrangements permitting to realize the programming of the welding operation.

FIG. 9 shows the schematics of the machine permitting to realize the cycle of diagram of FIG. 3.

This device operates in the following manner:

The detecting block 48 has a variable position permitting to record the value of the friction torque and this detecting block is connected to the jack in the manner represented on FIG. 8.

When the friction couple torque is lower than the recorded value, the movable shutter 54 closes orifice 53 and opens orifice 52. Then the pressure increases at 53 and the servo valve 57 establishes through the proportional fluid amplifier the communication with jack 6 in such a manner as to increase the friction forces and therefore the friction torque.

However, if this torque exceeds the desired value, shutter 54 moves to the left and opens orifice 53 while it shuts off orifice 52. The servo valve 57 closes itself and the force tends to decrease.

The position of balance is reached when the shutter is between the two orifices 52–53.

During the preliminary period the fluid is introduced in the main jack 6 at a low flow. It is only when the parts to be welded come into contact that the cylinder of the jack can be filled up and that the small jack 58 can then move the detecting block 48 towards the left on an adjustable stop 59 predetermining the value of the friction torque during the welding operation.

The period is indicated on FIG. 3 of line $o$ to $t$ on curve 16.

Due to the regulating action of the device the shutter is driven and follows the detecting block. The servo valve is then controlled and it acts upon the jack reducing the friction torque.

When the detecting block is against stop 59, the friction torque foreseen is recorded. It is the torque which is indicated at $C_1$ on FIG. 3. It is obtained at time $T_1$. At this instant the switch 60 shown on FIG. 9 is brought into action and actuates a device for counting the time. Once this period is passed, the driving of the part is stopped and the forging valve 61 is opened. The welding operation is terminated.

Once the welded part has been removed valve 62 is opened to bring back the valve to its initial position. One can also replace the counting of time by a measuring device for measuring the temperature on FIG. 1. Of course, the invention is not limited to the above examples as described and represented. From these examples one can foresee other modes and other forms of realization within the scope of the invention.

What is claimed is:

1. In a method of friction welding, the steps comprising driving at a fixed angular velocity at least one of the parts to be welded, applying an axial force between the part in rotation and the stationary part or parts to be welded to the said first part in order to produce heat from the friction between the parts, measuring the resistive torque between the two parts, generating an electric voltage proportional to the aforesaid resistive torque, comparing the instantaneous values of said voltage with a preset program of desired resistive torque with respect to time, determining the difference between the two signals by subtracting one from the other and utilizing the aforementioned difference signal to effect a change in axial force so as to bring the resistive torque to the desired level at each successive instant as preset by the aforementioned program.

2. A method in accordance with claim 1 in which the torque measuring step is replaced by a temperature measuring step which is compared to a program of temperature of the work piece with respect to time.

3. In a friction welding machine the improvement comprising means for driving in rotation at least one of the parts to be welded, means for maintaining the angular velocity at a preset level, means for applying a force between the contacting surfaces of the parts to be welded, means for measuring the resistance torque between the said contacting surfaces, means for comparing the aforesaid measurement with a preset torque versus time program so as to determine the instantaneous error between the measured torque and the preset value of torque, means dependent upon said error for effecting a change in the aforementioned force producing means so as to reduce the error to some minimum value.

4. Apparatus as in claim 3 in which the torque measuring means comprises a strain gauge sensing device which produces a voltage proportional to the resistive torque.

5. Apparatus as in claim 3 in which the driving means is a motor whose input current is proportional to the said resistive torque.

6. Apparatus as in claim 3 in which the driving means is an hydraulic motor, operated by the flow of a fluid material, whose torque is proportional to the pressure of the hydraulic fluid.

7. Apparatus as in claim 3 in which the means for measuring the said resistive torque includes a dynamometer, in association with the driving means and a tachometer means for measuring the torque produced by the inertial moment of the kinematic chain of the said driving means.

8. Apparatus as in claim 3 in which the means for measuring the resistive torque includes a tachometer and means for differentiating the output voltage of the said tachometer.

References Cited

UNITED STATES PATENTS

| | | | |
|---|---|---|---|
| 3,162,068 | 12/1964 | Hardy | 228—2 |
| 3,234,644 | 2/1966 | Hollander | 228—2 X |
| 3,235,158 | 2/1966 | Hollander | 228—2 |
| 3,235,161 | 2/1966 | Cooper | 228—2 |
| 3,337,108 | 8/1967 | Taylor | 228—2 |
| 3,380,641 | 4/1968 | Deemie et al. | 228—2 |
| 3,417,457 | 12/1968 | Burke et al. | 29—470.3 |
| 3,462,826 | 8/1969 | Farmer et al. | 29—470.3 |

OTHER REFERENCES

M. B. Hollander, C. J. Cheng and J. C. Wyman: Friction Welding Parameter Analysis, Welding Journal, November 1963, pp. 1–8.

Hasui, Atsushi, Sadao Furushima and Junichi Kinugawa: Experimental Studies on Friction Welding Phenomena 1968; Transactions of National Research Institute for Metals, vol. 10, No. 4.

JOHN F. CAMPBELL, Primary Examiner

R. J. CRAIG, Assistant Examiner

U.S. Cl. X.R.

156—73; 228—2